(12) United States Patent
Anderson et al.

(10) Patent No.: US 9,994,486 B1
(45) Date of Patent: Jun. 12, 2018

(54) REFRACTORY COMPOSITION RESISTANT TO HIGH TEMPERATURE SHOCK AND CREEP

(71) Applicant: Magneco/Metrel, Inc., Addison, IL (US)

(72) Inventors: Michael W Anderson, West Chicago, IL (US); Daniel Snyder, Winfield, IL (US); Lara Binz, Volo, IL (US); Eric Boring, Hampshire, IL (US)

(73) Assignee: Magneco/Metrel, Inc., Addison, IL (US)

( * ) Notice: Subject to any disclaimer, the term of this patent is extended or adjusted under 35 U.S.C. 154(b) by 0 days. days.

(21) Appl. No.: 15/461,322

(22) Filed: Mar. 16, 2017

(51) Int. Cl.
C04B 33/22 (2006.01)

(52) U.S. Cl.
CPC ...... *C04B 33/22* (2013.01); *C04B 2235/3217* (2013.01)

(58) Field of Classification Search
CPC ..... C04B 35/18; C04B 35/6316; C04B 28/24; C04B 14/041; C04B 14/06
See application file for complete search history.

(56) References Cited

U.S. PATENT DOCUMENTS

| 4,331,773 | A | * | 5/1982 | Hongo | C04B 35/6303 501/100 |
| 5,147,830 | A | | 9/1992 | Banerjee | |
| 5,422,323 | A | * | 6/1995 | Banerjee | C04B 35/18 266/280 |
| 5,494,267 | A | | 4/1996 | Anderson | |
| 5,505,893 | A | | 4/1996 | Connors, Jr. | |
| 5,569,320 | A | * | 10/1996 | Sasaki | B22C 1/205 106/287.16 |
| 5,584,921 | A | | 12/1996 | Wagner et al. | |
| 5,632,937 | A | | 5/1997 | Soofi | |
| 5,989,330 | A | * | 11/1999 | Semler | C04B 28/24 106/286.1 |
| 6,528,011 | B2 | | 3/2003 | Connors, Sr. | |
| 6,773,770 | B1 | | 8/2004 | Sugiyama et al. | |
| 7,176,153 | B2 | | 2/2007 | Anderson | |
| 7,500,511 | B2 | | 7/2009 | Connors | |
| 7,562,694 | B2 | | 7/2009 | Connors, Jr. | |
| 8,128,996 | B2 | | 3/2012 | Davies et al. | |
| 8,505,335 | B2 | | 8/2013 | Connors, Sr. | |
| 8,505,336 | B2 | | 8/2013 | Connors, Sr. | |
| 9,334,196 | B2 | | 5/2016 | Connors, Jr. et al. | |
| 9,376,575 | B2 | | 6/2016 | Connors, Jr. et al. | |
| 9,512,042 | B2 | | 12/2016 | Connors, Jr. et al. | |
| 2002/0001604 | A1 | | 1/2002 | Shigeru et al. | |
| 2004/0058166 | A1 | | 3/2004 | Nakamura | |
| 2004/0077768 | A1 | | 4/2004 | Greenwood | |
| 2005/0210615 | A1 | | 9/2005 | Shastry et al. | |
| 2005/0214720 | A1 | | 9/2005 | Milanovich et al. | |
| 2005/0276923 | A1 | | 12/2005 | Davies et al. | |
| 2007/0140986 | A1 | | 6/2007 | Prencipe et al. | |
| 2007/0269650 | A1 | | 11/2007 | Leuninger et al. | |
| 2007/0272382 | A1 | | 11/2007 | Becker et al. | |
| 2010/0247700 | A1 | * | 9/2010 | Hayashi | B22C 9/04 425/176 |
| 2012/0031300 | A1 | | 2/2012 | Olsen et al. | |

FOREIGN PATENT DOCUMENTS

| EP | 0952 194 A2 | 10/1999 |
| EP | 1 186 637 A1 | 3/2002 |
| EP | 1 186 637 A1 | 8/2006 |
| WO | WO 2013/034158 A1 | 3/2013 |

OTHER PUBLICATIONS

R. Hashemi-Nasab et al., "Effect of Silica Nanoparticles Surface Treatment on in Situ Pollymerization of Sytrene-Butyl Acrylate Latex", Progress in Organic Coatings, 2013, v. 7 pp. 1016-1023.
Co-pending U.S. Appl. No. 15/439,868, filed Feb. 22, 2017.
Co-pending U.S. Appl. No. 15/439,885, filed Feb. 22, 2017.

* cited by examiner

*Primary Examiner* — Noah S Wiese
(74) *Attorney, Agent, or Firm* — Maxwell J. Petersen; Lewis, Brisbois, Bisgaard & Smith LLP

(57) ABSTRACT

A refractory composition yields refractory articles having excellent resistance to high-temperature thermal shock and creep. The refractory composition is based primarily on chamotte having controlled particle sizes, and may also include mullite, fused silica, calcined alumina and microsilica, having controlled particle sizes. The refractory composition includes an aqueous colloidal silica binder that provides excellent castability and binding between the ingredients following drying.

20 Claims, No Drawings

REFRACTORY COMPOSITION RESISTANT TO HIGH TEMPERATURE SHOCK AND CREEP

FIELD OF THE INVENTION

This invention is directed to a refractory composition that is useful for making refractory articles, linings and parts that are resistant to high temperature shock and creep.

BACKGROUND OF THE INVENTION

Refractory compositions are used to manufacture, repair and/or coat a wide variety of articles that are used in the processing of molten steel, aluminum, copper, and other molten metals. The refractory article can be a refractory part, container or liner thereof. Examples include refractory bricks, pipes, plugs, troughs, runner, ladles, furnaces, ovens, subhearths, walls, ceilings, roofs, floors, ramps, launders, lentils, door jams and doors. The refractory compositions are described in a wide variety of patents and patent applications, including without limitation U.S. Pat. No. 5,505,893, issued to Connors, Jr; U.S. Pat. No. 5,494,267, issued to Anderson et al; U.S. Pat. No. 5,422,323, issued to Banerjee et al; and U.S. Pat. No. 5,147,830, issued to Banerjee et al.

Many of these applications involve exposure of the refractory to temperatures of 600° C. to 1800° C. At these high temperatures, the refractory articles must be able to withstand corrosion, shock and deformation.

Due to the extreme exposure conditions, refractory articles require periodic replacement or repair. This typically requires down time for the process that uses the refractory. There is a need or desire for a refractory composition that has improved resistance to shock and creep when used in high temperature processes.

SUMMARY OF THE INVENTION

The present invention is directed to a refractory composition that provides excellent shock resistance and creep resistance at high temperatures. The refractory composition includes the following ingredients, based on the weight of the composition:
about 50% to about 90% by weight chamotte;
about 5% to about 25% by weight mullite;
about 3% to about 20% by weight fused silica; and
about 3% to about 30% by weight of an aqueous colloidal silica binder.

The present invention is also directed to a refractory composition that includes chamotte and about 3% to about 30% by weight of an aqueous colloidal silica binder. The chamotte includes the following components, based on the weight of the chamotte:
about 35% to about 65% by weight of a first chamotte component having particle sizes ranging from 2380 to 6730 microns;
about 10% to about 35% by weight of a second chamotte component having particle sizes ranging from 841 to less than 2380 microns, and
about 15% to about 45% by weight of a third chamotte component having particle sizes less than 841 microns.

The present invention is also directed to a method of making a refractory article that includes the following steps:
providing a refractory composition that includes, based on the weight of the composition, about 50% to about 90% by weight chamotte, about 5% to about 25% by weight mullite, about 3% to about 20% by weight fused silica, and about 3% to about 30% by weight of an aqueous colloidal silica binder;
forming the refractory composition into a refractory article; and
drying the refractory article.

The present invention is also directed to a method of making a refractory article that includes the following steps:
providing dry ingredients that include chamotte, the chamotte including about 35% to about 65% by weight of a first chamotte component having particle sizes ranging from 2380 to 6730 microns, about 10% to about 35% by weight of a second chamotte component having particle sizes ranging from 841 to less than 2380 microns and about 15% to about 45% by weight of a third chamotte component having particle sizes less than 841 microns;
adding an aqueous colloidal silica binder to the dry ingredients, and mixing the aqueous colloidal silica binder with the dry ingredients to form the refractory composition;
forming the refractory composition into a refractory article; and
drying the refractory article.

The refractory composition of the invention can be used to make a wide variety of refractory articles, including refractory parts, containers, and liners. Examples of refractory articles include without limitation refractory bricks, pipes, plugs, troughs, runners, ladles, furnaces, ovens, subhearths, walls, ceilings, roofs, floors, ramps, launders, lentils, door jams, and doors. The refractory articles thus formed have excellent high temperature shock resistance and creep resistance, compared to conventional refractories.

DETAILED DESCRIPTION OF THE INVENTION

In accordance with the invention, a refractory composition is provided that can be used to form refractory articles having excellent high-temperature shock resistance and creep resistance. The refractory composition primarily includes chamotte, suitably about 50% to about 90% by weight chamotte, or about 55% to about 85% by weight, or about 60% to about 70% by weight. Chamotte is defined herein as a cement-free alumina-silicate refractory composite that includes about 35% by weight to about 49% by weight alumina ($Al_2O_3$), about 51% to about 65% by weight silica ($SiO_2$), and zero to about 4% by weight iron, produced by firing selected clays having this composition to high temperatures of 900-1200° C., followed by grinding and screening to desired particle sizes. Suitably, the chamotte includes about 40% to about 45% by weight alumina, about 55% to about 60% by weight silica, and 0 to about 3% by weight iron.

In one embodiment of the invention, the chamotte includes first, second and third chamotte components having selected particle sizes. The first chamotte component has particle sizes ranging from 2380 microns (8 mesh) to 6730 microns (3 mesh). The second chamotte component has particle sizes ranging from 841 microns (20 mesh) to less than 2380 microns (8 mesh). The third chamotte component has particle sizes less than 841 microns (8 mesh). The first, second and third chamotte components are prepared by grinding and screening using the appropriate mesh screen sizes, as explained above. The chamotte suitably includes about 35% to about 65% by weight of the first chamotte component, or about 40% to about 60% by weight, or about 45% to about 55% by weight, based on the weight of the chamotte. The chamotte suitably includes about 10% to about 35% by weight of the second chamotte component, or about 15% to about 30% by weight, or about 17% to about 25% by weight, based on the weight of the chamotte. The chamotte suitably includes about 15% to about 45% by weight of the third chamotte component, or about 20% to about 40% by weight, or about 25% to about 35% by weight, based on the weight of the chamotte.

In one embodiment of the invention, the refractory composition includes mullite, suitably in an amount of about 5% to about 25% by weight, or about 10% to about 20% by weight, based on the weight of the refractory composition. Mullite is a rare silicate mineral having either of two stoichiometric forms, namely $3Al_2O_3 \cdot 2SiO_2$ or $2Al_2O_3 \cdot SiO_2$. Mullite is resistant to corrosion under high temperature conditions and helps to facilitate excellent corrosion resistance of the overall refractory composition. The mullite suitably has a median particle size of less than about 100 microns, or about 1 to about 50 microns and can suitably have particle sizes of less than about 44 microns (325 mesh). By using micronized mullite having the small particle size, the mullite helps to stabilize the ingredients of the wet composition, helping them to remain uniformly suspended during casting. The mullite also helps to fill the pores of the dry refractory composition, thus reducing its porosity and improving its resistance to penetration by molten metals and vapors.

In one embodiment of the invention, the refractory composition includes fused silica particles, suitably in an amount of about 3% to about 20% by weight, or about 5% to about 15% by weight. Fused silica is an amorphous (non-crystalline) silica composed of a silicon dioxide having a highly crosslinked three dimensional molecular structure. The fused silica particles suitably have a median particle size of less than about 100 microns, or about 1 to about 50 microns, and can suitably have particles sizes less than about 44 microns (325 mesh). The fused silica also helps to fill the pores of the refractory composition, thus reducing its porosity and improving its resistance to penetration by molten metal and vapors.

In one embodiment, the refractory composition includes calcined alumina, suitably in an amount of about 0.5% to about 4% by weight, or about 1% to about 3% by weight. The calcined alumina may have a median particle size of about less than about 100 microns, or about 1 to about 50 microns, and can suitably have particle sizes less than about 44 microns (325 mesh). The calcined alumina also helps fill the pores of the refractory composition, thus reducing its porosity and improving its resistance to penetration by molten metals and vapors.

In one embodiment, the refractory composition includes microsilica, suitably in amounts of about 0.5% to about 4% by weight, or about 1% to about 3% by weight. The optional microsilica (which is exclusive of the colloidal silica binder described below) may have a median particle size of about 100 microns or less (e.g. about 0.1 to about 100 microns), or about 25 microns or less, or about 15 microns less, or about 5 microns or less. When used, the microsilica improves the initial flow characteristics of the refractory composition.

The refractory composition includes about 3% to about 30% by weight of an aqueous colloidal silica binder, suitably about 5% to about 25% by weight, or about 10% to about 20% by weight. The aqueous colloidal silica binder includes about 20% to about 70% by weight colloidal silica particles and about 30% to about 80% by weight water, suitably about 40% to about 60% by weight colloidal silica particles and about 40% to about 60% by weight water, based on the weight of the binder. The term "colloidal silica" refers to silica ($SiO_2$) particles having particle sizes that cause them to repel each other and remain uniformly suspended in the aqueous medium, prior to being combined with the other ingredients of the refractory composition. The colloidal silica particles should have a median particle size of about 1 to about 100 nanometers, or about 5 to about 90 nanometers, or about 10 to 80 nanometers, or about 12 to about 75 nanometers.

The refractory composition can be made by mixing the chamotte, mullite, fused silica, calcined alumina (if present) and microsilica (if present) together, to form a dry blend. The dry ingredients may be tumble blended or otherwise mixed together using any suitable technique. The wet component, namely, the aqueous colloidal silica binder, is then mixed with the dry components to form a damp mixture that can be pumped, poured or otherwise transported to a mold to form a refractory article.

The present invention is also directed to a refractory composition that includes the same components, with percentages calculated based on the dry weight of the composition, after the water has been removed. The refractory composition includes, based on dry weight, about 55% to about 95% by weight of the chamotte, about 10% to about 30% by weight of the mullite, about 5% to about 25% by weight of the fused silica, and about 2% to about 25% by weight of the colloidal silica particles having a mean particle diameter of about 1 to about 100 nanometers.

The refractory composition may suitably include about 60% to about 90% by weight of the chamotte, or about 70% to about 80% by weight of the chamotte, based on the dry weight of the refractory composition. The chamotte may suitably include first, second and third chamotte components having the respective particle size ranges described above, and in the respective weight percentages described above, based on the weight of the chamotte.

The refractory composition may suitably include about 15% to about 25% by weight of the mullite, based on the dry weight of the refractory composition. The mullite may be present in either or both stoichiometric forms, $3Al_2O_3 \cdot 2SiO_2$ or $2Al_2O_3 \cdot SiO_2$, as described above, and may have the particle sizes described above. The refractory composition may suitably include about 10% to about 20% by weight of the fused silica, based on the dry weight of the refractory composition, and may have the particle sizes described above.

When present, the refractory composition may include about 1% to about 5% by weight calcined alumina, suitably about 2% to about 4% by weight calcined alumina having the particle sizes and description stated above, based on the dry weight of the refractory composition. When present, the refractory composition may include about 1% to about 5% by weight microsilica, suitably about 2% to about 4% by weight microsilica having the particle sizes and description stated above, based on the dry weight of the refractory composition.

The refractory composition may suitably include about 2% to about 25% by weight of the colloidal silica particles, or about 3% to about 20% by weight, or about 5% to about 15% by weight, based on the dry weight of the refractory composition. The colloidal silica particles serve as a binder between the remaining ingredients of the refractory composition. The binding occurs as the initially damp refractory composition is dried to remove water. The colloidal silica particles may have the particle sizes described above.

The present invention is also directed to a refractory article made from the refractory composition described above. The refractory article has the same composition as the refractory composition, based on the dry weight of the refractory composition, as described above. For example, the refractory article may include about 55% to about 95% by weight chamotte, about 10% to about 30% by weight mullite, about 5% to about 25% by weight fused silica, and about 2% to about 25% by weight colloidal silica particles.

Again, the chamotte may include about 35% to about 65% by weight of a first chamotte component, about 10% to about 35% by weight of a second chamotte component, and about 15% to about 45% by weight of a third chamotte component. The first chamotte component has particle sizes ranging from 2380 to 6730 microns. The second chamotte component has particle sizes ranging from 841 to less than 2380 microns. The third chamotte component has particle sizes of less than 841 microns.

The present invention is also directed to a refractory composition that includes about 3% to about 30% by weight of an aqueous colloidal silica binder as described above and the tri-component chamotte described above, with the remaining ingredients being optional. The chamotte includes, based on the weight of the chamotte, about 35% to about 65% by weight of a first chamotte component having particle sizes ranging from 2380 to 6730 microns, about 10% to about 35% by weight of a second chamotte component having particle sizes ranging from 841 to less than 2380 microns, and about 15% to about 45% by weight of a third chamotte component having particle sizes less than 841 microns. The refractory composition may also include about 5% to about 25% mullite having particle sizes less than 841 microns.

The present invention is also directed to a method of making a refractory article. The refractory article can be a refractory part, container or liner. Examples of refractory articles include without limitation refractory bricks, pipes, plugs, troughs, runners, ladles, furnaces, ovens, subhearths, walls, ceilings, roofs, floors, ramps, launders, lentils, door jams and doors. The refractory article can be made using any embodiment of the refractory compositions described above.

In one embodiment, the method includes the step of providing a refractory composition that includes, based on the weight of the composition, about 50% to about 90% by weight chamotte, about 5% to about 25% by weight mullite, about 3% to about 20% by weight fused silica, and about 3% to about 30% by weight of an aqueous colloidal silica binder, as described above. The method further includes the steps of forming the refractory composition into a refractory article, and drying the refractory article.

In one embodiment, the step of drying the refractory article includes the step of drying at room temperature for at least about 15 minutes, followed by baking at an elevated temperature of at least about 100° C. The baking can last anywhere from about 5 to about 30 hours, depending on the size and shape of the refractory article and its specific composition.

The chamotte can include the tri-component chamotte described above, and can be present in any amount described above. In one embodiment, the forming step includes the step of casting the refractory composition into a mold. The casting can be performed using any suitable technique, including pouring or pumping the refractory composition into the mold.

In one embodiment, the step of providing the refractory composition can be performed in two or more steps. For example, the dry components can be provided in a first step and the aqueous colloidal silica binder can be provided in a second step. In the first step, dry refractory ingredients can be combined that include, based on the weight of the refractory composition, about 50% to about 90% by weight chamotte, about 5% to about 25% by weight mullite, about 3% to about 20% by weight fused silica, and any other dry components. An aqueous colloidal silica binder (as described above) is then added and mixed with the dry component to form the refractory composition. The refractory composition may include about 3% to about 30% by weight of the aqueous colloidal silica binder. The refractory composition can then be cast into a mold or other forming device by pumping using a concrete pump, or by pouring or other known techniques.

The above refractory composition is then molded or otherwise formed into a refractory article, which can be dried and baked as described above. Drying can occur at room temperature for 15 minutes or longer, causing initial hardening and setting of the refractory article. Baking can occur at 100° C. or higher, for 5 to 30 hours, or a time sufficient to cause further hardening and setting of the refractory article.

In one embodiment, the method of making a refractory article includes a first step of providing dry ingredients that include chamotte. The chamotte includes about 35% to about 65% by weight of a first chamotte component having particle sizes ranging from 2380 to 6730 microns, about 10% to about 35% by weight of a second chamotte component having particle sizes ranging from 841 to less than 2380 microns, and about 15% to about 45% by weight of a third chamotte component having particle sizes less than 841 microns. In this embodiment, other dry ingredients are optional. In a second step, an aqueous colloidal silica binder (as described above) is added to the dry ingredients, and mixed with the dry ingredients to form a refractory composition. The resulting refractory composition suitably includes about 3% to about 30% by weight of the aqueous colloidal silica binder. The refractory composition can then be cast into a forming device to form a refractory part, which can be dried and baked as described above.

Other dry ingredients may be included in this embodiment of the refractory composition. These other ingredients include mullite, suitably present at about 5% to about 25% by weight of the refractory composition; fused silica, suitably present at about 3% to about 20% by weight of the refractory composition; calcined alumina, suitably present at about 0.5% to about 4% by weight of the refractory composition; and microsilica, suitably present at about 0.5% to about 4% by weight of the refractory composition. These ingredients may have the descriptions and particle sizes explained above.

EXAMPLES

A refractory composition was prepared having the following ingredients in the following amounts.

| Ingredient | Supplier | Particle Size | % By Weight of Dry Components | % By Weight of Refractory Composition |
|---|---|---|---|---|
| Chamotte (Mulcoa 43) | C.E. Minerals, Inc. | 3-8 mesh | 34.2 | 30.3 |
| Chamotte (Mulcoa 43) | C.E. Minerals, Inc. | 8-20 mesh | 14.8 | 13.1 |
| Chamotte (Mulcoa 43) | C.E. Minerals, Inc. | 20 mesh | 19.8 | 17.5 |
| Mullite (Mulcoa 47) | C.E. Minerals, Inc. | 325 mesh | 15.0 | 13.3 |
| Fused Silica (D.C. Silica Fines) | Precisions Electro-Minerals Co. | 325 mesh | 11.6 | 10.3 |
| Calcined Alumina (AC-2) | Aluchem, Inc. | 325 mesh | 2.0 | 1.8 |
| Microsilica (955) | Elkem | <1 micron | 2.5 | 2.2 |
| Magnesium Oxide (Setting Agent) | | | 0.1 | 0.1 |
| Subtotal | | | 100 | 88.5 |
| Colloidal Silica Binder (Metset 2032-S, 40% solids) | | | 13.0 | 11.5 |
| TOTAL | | | | 100 |

The inventive composition was tested against a conventional cordierite kiln furnace composition as follows. Thermal shock was tested using ASTM C-1172. When cycled at 1100° C., refractory plates made using the inventive composition (pre-fired at 1100° C.) were found to lose only 27% of their bend strength. By comparison, prior art cordierite plates were found to lose 62% of their bend strength under the same test conditions. Creep was tested using ASTM C-832, at 1316° C. using a 25 psi load. Under these conditions, the inventive composition exhibited a very low creep rate of -0.005% per hour.

The embodiments of the invention described herein are presently preferred. Various modifications and improvements can be made without departing from the spirit and scope of the invention. The scope of the invention is indicated by the appended claims. All changes that fall within the meaning and range of equivalents are intended to be embraced therein.

We claim:

1. A refractory composition, comprising, based on the weight of the composition:
   about 50% to about 90% by weight chamotte;
   about 5% to about 25% by weight mullite;
   about 3% to about 20% by weight fused silica;
   about 0.5% to about 4% by weight calcined alumina; and
   about 3% to about 30% by weight of an aqueous colloidal silica binder that includes about 20% to about 70% by weight colloidal silica particles and about 30% to about 80% by weight water based on the weight of the binder.

2. The refractory composition of claim 1, wherein the chamotte comprises:
   a first chamotte component having screen mesh particle sizes ranging from 2380 to 6730 microns;
   a second chamotte component having screen mesh particle sizes ranging from 841 to less than 2380 microns; and
   a third chamotte component having screen mesh particle sizes less than 841 microns.

3. The refractory composition of claim 2, wherein the chamotte comprises about 35% to about 65% by weight of the first chamotte component, based on the weight of the chamotte.

4. The refractory composition of claim 3, wherein the chamotte comprises about 10% to about 35% by weight of the second chamotte component, based on the weight of the chamotte.

5. The refractory composition of claim 4, wherein the chamotte comprises about 15% to about 45% by weight of the third chamotte component, based on the weight of the chamotte.

6. The refractory composition of claim 1, comprising about 60% to about 80% by weight of the chamotte, about 10% to about 20% by weight of the mullite, about 5% to about 15% by weight of the fused silica, and about 5% to about 20% by weight of the aqueous colloidal silica binder.

7. The refractory composition of claim 1, wherein the mullite has particle sizes less than about 44 microns.

8. The refractory composition of claim 1, further comprising about 0.5% to about 4% by weight microsilica.

9. A refractory composition comprising, based on the dry weight of the refractory composition:
   about 55% to about 95% by weight chamotte;
   about 10% to about 30% by weight mullite;
   about 5% to about 25% by weight fused silica;
   about 1% to about 5% by weight microsilica; and
   about 2% to about 25% by weight colloidal silica particles having a mean particle diameter of about 1 to about 100 nanometers.

10. The refractory composition of claim 9, wherein the chamotte comprises:
    a first chamotte component having screen mesh particle sizes ranging from 2380 to 6730 microns;
    a second chamotte component having screen mesh particle sizes ranging from 841 to less than 2380 microns; and
    a third chamotte component having screen mesh particle sizes less than 841 microns.

11. The refractory composition of claim 10, wherein the chamotte comprises about 35% to about 65% by weight of the first chamotte component, based on the weight of the chamotte.

12. The refractory composition of claim 11, wherein the chamotte comprising about 10% to about 35% by weight of the second chamotte component, based on the weight of chamotte.

13. The refractory composition of claim 12, wherein the chamotte comprises about 15% to about 45% by weight of the third chamotte component, based on the weight of the chamotte.

14. The refractory composition of claim 9, wherein the mullite has particle sizes less than about 44 microns.

15. The refractory composition of claim 9, wherein the colloidal silica particles have a median size of about 12 to about 75 nanometers.

16. The refractory composition of claim 9, further comprising about 1% to about 5% by weight calcined alumina.

17. The refractory composition of claim 9, further comprising about 1% to about 5% by weight microsilica.

18. A refractory article comprising, based on the dry weight of the refractory article:
   about 55% to about 95% by weight chamotte;
   about 10% to about 30% by weight mullite;
   about 5% to about 25% by weight fused silica; and
   about 2% to about 25% by weight colloidal silica particles having a mean particle diameter of about 1 to about 100 nanometers;
   wherein the chamotte comprises, based on the weight of the chamotte:
   about 35% to about 65% by weight of a first chamotte component having screen mesh particle sizes ranging from 2380 to 6730 microns;
   about 10% to about 35% by weight of a second chamotte component having screen mesh particle sizes ranging from 841 to less than 2380 microns, and
   about 15% to about 45% by weight of a third chamotte component having screen mesh particle sizes less than 841 microns.

19. A refractory composition, comprising chamotte and about 3% to about 30% by weight of an aqueous colloidal silica binder, wherein the chamotte comprises, based on the weight of the chamotte:
   about 35% to about 65% by weight of a first chamotte component having screen mesh particle sizes ranging from 2380 to 6730 microns;
   about 10% to about 35% by weight of a second chamotte components having screen mesh particles sizes ranging from 841 to less than 2380 microns, and about 15% to about 45% by weight of a third chamotte component having screen mesh particles sizes less than 841 microns.

20. The refractory composition of claim 19, further comprising about 5% to about 25% by weight mullite having particle sizes less than about 44 microns.

* * * * *